(No Model.)

R. V. DORSEY.
SULKY CULTIVATOR.

No. 525,096. Patented Aug. 28, 1894.

Witnesses,

Inventor,
Richard V. Dorsey,
By Dewey & Co.
Attys

UNITED STATES PATENT OFFICE.

RICHARD VALENTINE DORSEY, OF WATSONVILLE, CALIFORNIA, ASSIGNOR TO JENSEN & LAURITZEN, OF SAME PLACE.

SULKY-CULTIVATOR.

SPECIFICATION forming part of Letters Patent No. 525,096, dated August 28, 1894.

Application filed April 13, 1894. Serial No. 507,449. (No model.)

*To all whom it may concern:*

Be it known that I, RICHARD VALENTINE DORSEY, a citizen of the United States, residing at Watsonville, Santa Cruz county, State of California, have invented an Improvement in Sulky-Cultivators; and I hereby declare the following to be a full, clear, and exact description of the same.

The object of my invention is to provide an improved and simplified mechanism whereby both ends of the cultivator may be raised and depressed simultaneously.

My invention relates to improvements in that class of machines known as sulky cultivators, in which the cultivator frame is made to rise and fall with reference to the wheels and pole of the machine, so as to either raise it out of the ground or depress it into the ground.

My invention consists in certain details of construction which will be more fully explained by reference to the accompanying drawings, in which—

Figure 1:
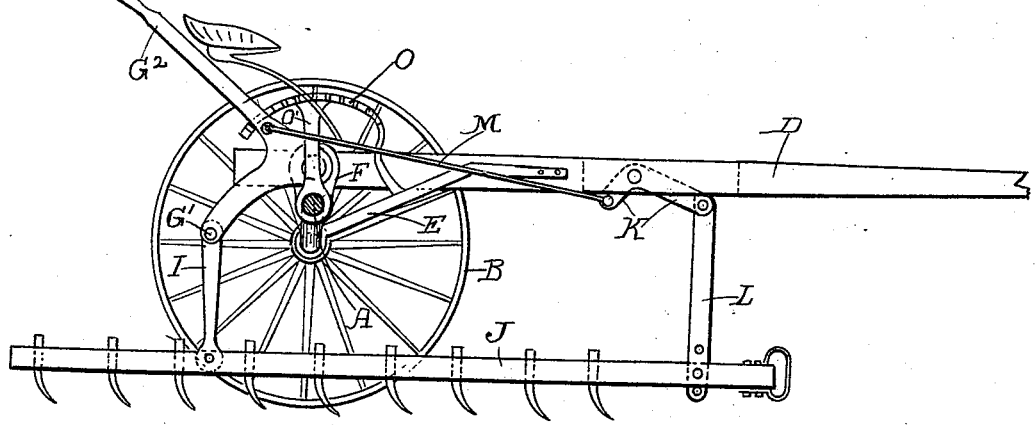
Figure 2:
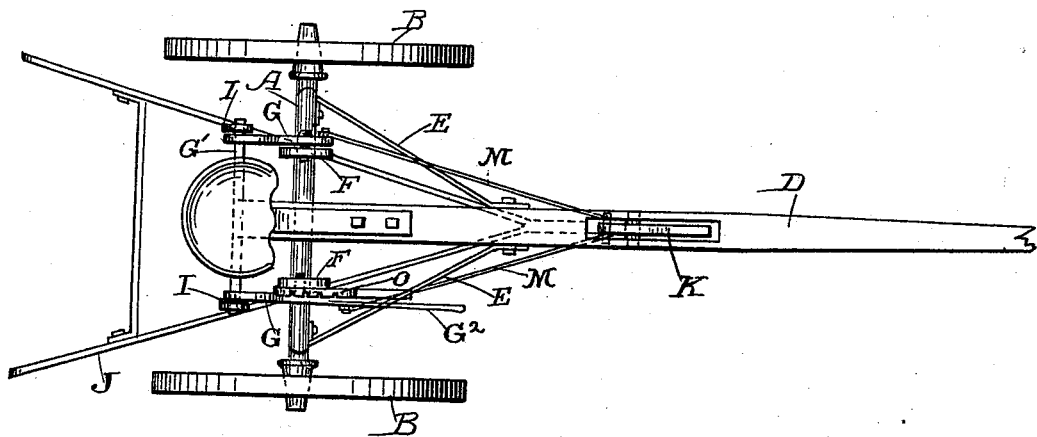

Figure 1 is a side sectional elevation with the inner wheel removed. Fig. 2 is a plan view.

A is the wheel axle bent downwardly or cranked at each end, and having the wheels B turning upon the spindles at the outer ends of the axle.

The pole D is clipped at the rear, to the center of the axle, and braces E extend from each side of the pole, and are fixed to the outer ends of the axle inside of the wheels so that the axle is fixed rigidly with relation to the pole.

Upon the top of the axle at each side of the pole are vertical lugs or standards F, and to these are fulcrumed the angles of bell crank levers G, the rear ends of which are united by a transverse bar G', either bolted or otherwise rigidly secured thereto so as to form a continuous and rigid structure.

The upwardly projecting arm of one of these bell crank levers is extended so as to form the hand lever G² by which the operator adjusts and regulates the position of the cultivator. From the rear projecting ends of these bell crank levers links or hangers I extend down, and are secured to the diverging sides of the A-shaped cultivator J.

K is a bell crank lever having its angle fulcrumed in a slot in the pole and having one arm projecting toward the front, and the other downwardly, this bell crank lever standing in opposition to the bell crank levers G. L is a depending link connecting the front arm of this bell crank lever, with the front end of the cultivator frame. M M are rods connecting the downwardly projecting arm of this bell crank lever, with the upwardly projecting arms of the bell crank levers G, so that by the movement of the hand lever to the front, the upwardly projecting arms of the levers G, and the downwardly projecting arm of the lever L will be moved toward the front, and the rearwardly projecting arms of the levers G and the arm of the lever L which projects to the front, will be simultaneously raised, and the connecting links will raise the front and rear of the cultivator frame at the same time. The reverse movement of the lever correspondingly depresses the frame and sets the teeth of the cultivator into the ground.

The rack O has an extension from the front end which is bolted to one of the braces E, and a vertical arm O' extends downwardly and is secured on the axle. This construction enables me to remove the rack by taking out two bolts, and the other parts are easily separated and removed.

By uniting the rear ends of the bell crank levers G, as shown, the power of the single hand lever is applied to both so as to make them lift evenly.

Having thus described my invention, what I claim as new, and desire to secure by Letters Patent, is—

1. In a cultivator, the wheel axle immovably fixed to the rear of the pole having upwardly projecting lugs or standards near its opposite ends, bell crank levers having the angles fulcrumed to said standards, with one arm projecting rearwardly and the other upwardly, a single bell crank lever having its angle fulcrumed in a slot in the pole, with one arm projecting forward and the other downwardly, connecting rods extending from the upwardly projecting arms of each of the first named levers to the downwardly projecting arm of the lever fulcrumed in the pole, links connecting the rear arms of each of the first named levers with the rear portion of the cultivator frame, and a front arm of the pole lever with the front end of said frame, and a hand lever whereby the mechanism is actuated to raise and depress the cultivator.

2. In a cultivator, the means for raising and depressing the front and rear of the cultivator frame simultaneously, consisting of bell crank levers fulcrumed upon the top of the fixed wheel axle near each end thereof, and a corresponding lever fulcrumed in a vertical slotted channel in the pole, rods connecting the levers upon the axle with that upon the pole, a transverse bar extending from one rear lever to the other and rigidly uniting them and suspending links extending from the upper arms of the levers to the cultivator frame, a hand lever forming an extension of one of the bell crank levers, and a segmental holding rack having the front end extended and connected with one of the side braces, and a vertical extension of the rear end secured to the axle.

3. The bell crank levers G having their angles adapted to be fulcrumed to vertical standards upon the opposite end portions of the fixed axle of a wheel cultivator, upwardly extending arms for the attachment of rods to connect with a single bell crank lever fulcrumed to the pole, and rearwardly projecting arms from which the rear of the cultivator frame is suspended, said arms being connected by a transverse bar, whereby the two levers are united into a single structure and an extension of one of the upwardly projecting arms to form a hand lever.

In witness whereof I have hereunto set my hand.

RICHARD VALENTINE DORSEY.

Witnesses:
JOHN ELLICKSON,
HANS P. JENSEN.